(12) United States Patent
Moore

(10) Patent No.: US 9,754,340 B2
(45) Date of Patent: Sep. 5, 2017

(54) APPARATUS FOR PERFORMING CONSUMER RESEARCH AND METHODS FOR USING SAME

(71) Applicant: NESTEC S.A., Vevey (CH)

(72) Inventor: Linda Grace Moore, White Cloud, MI (US)

(73) Assignee: Nestec S.A., Vevey (CH)

( * ) Notice: Subject to any disclaimer, the term of this patent is extended or adjusted under 35 U.S.C. 154(b) by 221 days.

(21) Appl. No.: 14/381,353

(22) PCT Filed: Feb. 27, 2013

(86) PCT No.: PCT/IB2013/051572
§ 371 (c)(1),
(2) Date: Aug. 27, 2014

(87) PCT Pub. No.: WO2013/128387
PCT Pub. Date: Sep. 6, 2013

(65) Prior Publication Data
US 2015/0044661 A1   Feb. 12, 2015

Related U.S. Application Data

(60) Provisional application No. 61/604,827, filed on Feb. 29, 2012.

(51) Int. Cl.
*G06Q 90/00* (2006.01)
*G06Q 30/02* (2012.01)
(Continued)

(52) U.S. Cl.
CPC ............ *G06Q 90/00* (2013.01); *A63J 1/00* (2013.01); *E04H 3/26* (2013.01); *G06Q 30/02* (2013.01);
(Continued)

(58) Field of Classification Search
CPC  G06C 30/02; G06C 30/0201; G06C 30/0202; G06C 30/0204; G06C 30/0205; G06C 30/0241; G06F 17/60
See application file for complete search history.

(56) References Cited

U.S. PATENT DOCUMENTS 6,053,738 A * 4/2000 Ivey, Jr. ............... A61L 9/125
273/460
6,293,052 B1 * 9/2001 Varnado, Jr. ........... E04H 3/22
52/7
(Continued)

FOREIGN PATENT DOCUMENTS

SU    779554 A1    11/1980

OTHER PUBLICATIONS

English Translation of A. F. Shvetsov, SU 779554 A1 (Soviet Union), published 19801115 (translated under authority of USPTO, Jun. 2016).*

*Primary Examiner* — Nikolai A Gishnock
(74) *Attorney, Agent, or Firm* — Gary M. Lobel, Esq.

(57) ABSTRACT

Apparatuses for performing consumer testing and methods for using same are provided. Methods for administering consumer research are also provided. In a general embodiment, the present disclosure provides apparatuses having a rotatable platform with at least one divider separating the platform into at least two sections, where each of the at least two sections includes a life-like scenario configured for use by a consumer participant during a consumer research test. Such apparatuses provide flexibility and efficiency of time, space and cost for performing consumer research since the research may be performed in a timely fashion, in a number of different life-like scenarios, in a limited amount of space, and may be directly observed from one location or using one set of audio/visual equipment.

25 Claims, 4 Drawing Sheets

(51) Int. Cl.
*G09B 19/00* (2006.01)
*A63J 1/00* (2006.01)
*E04H 3/26* (2006.01)

(52) U.S. Cl.
CPC ..... *G06Q 30/0201* (2013.01); *G06Q 30/0202* (2013.01); *G06Q 30/0204* (2013.01); *G06Q 30/0205* (2013.01); *G09B 19/00* (2013.01)

(56) References Cited

U.S. PATENT DOCUMENTS

| | | | | |
|---|---|---|---|---|
| 6,381,583 B1 * | 4/2002 | Kenney | ............... | G06Q 30/06 703/6 |
| 6,453,194 B1 * | 9/2002 | Hill | ............... | A61B 5/0488 128/898 |
| 6,580,441 B2 * | 6/2003 | Schileru-Key | ...... | G06F 3/04815 705/27.1 |
| 6,783,084 B1 * | 8/2004 | Nelson | ............... | A61L 9/125 239/304 |
| 8,140,989 B2 * | 3/2012 | Cohen | ............... | G06Q 50/22 703/1 |
| 8,321,797 B2 * | 11/2012 | Perkins | ............... | G06Q 30/02 715/757 |
| 8,797,327 B2 * | 8/2014 | Finn | ............... | G06T 13/20 345/156 |
| 2002/0091534 A1 * | 7/2002 | Berning | ............... | G06Q 10/101 705/300 |
| 2002/0188460 A1 * | 12/2002 | Resh | ............... | G06Q 30/0203 705/7.32 |
| 2005/0108078 A1 * | 5/2005 | Royale | ............... | G06Q 30/02 705/7.31 |
| 2005/0177463 A1 * | 8/2005 | Crutchfield | ............ | G06Q 30/06 705/26.9 |
| 2008/0162261 A1 * | 7/2008 | Velazquez | ............... | G06F 3/011 715/757 |
| 2008/0255949 A1 * | 10/2008 | Genco | ............... | A61B 5/0205 705/14.4 |
| 2015/0302426 A1 * | 10/2015 | Rogers | ............... | G06Q 30/0201 705/7.29 |

* cited by examiner

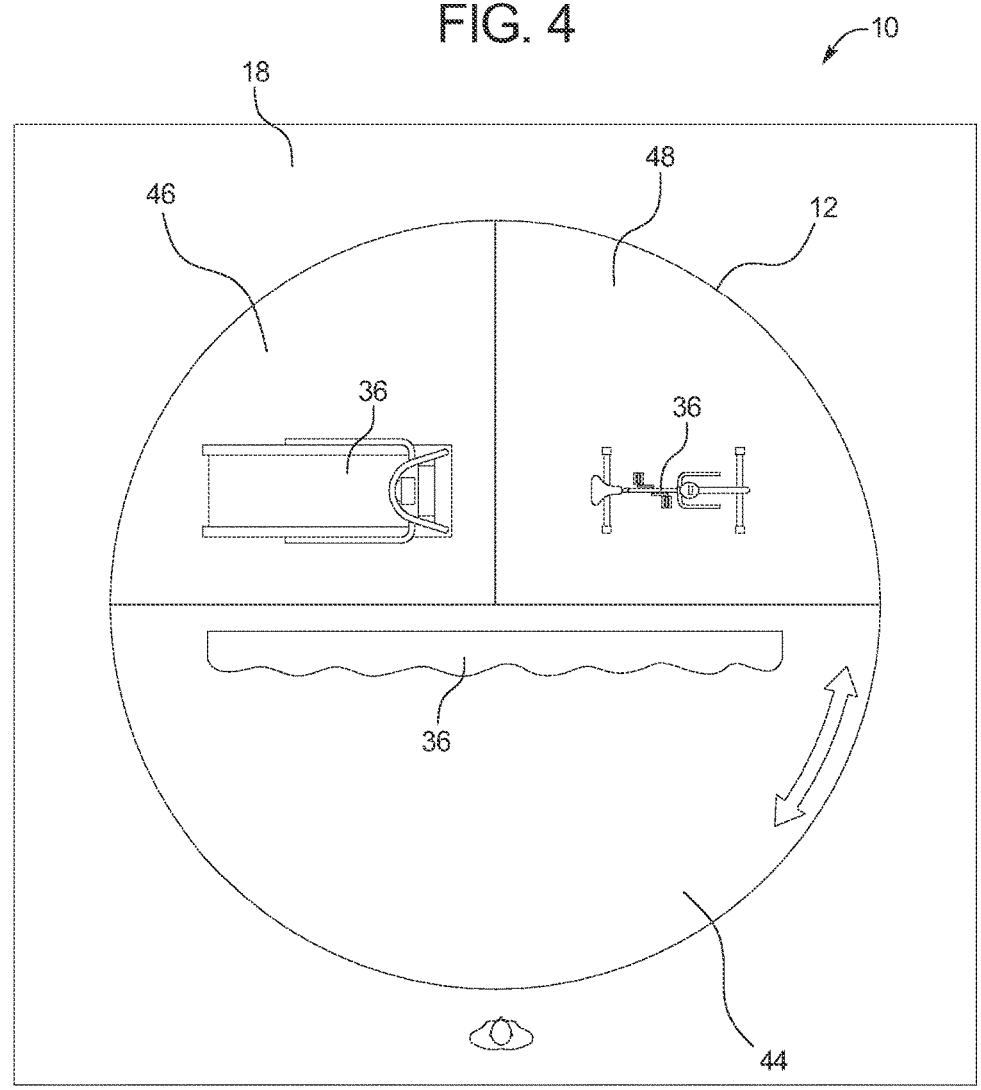

APPARATUS FOR PERFORMING CONSUMER RESEARCH AND METHODS FOR USING SAME

BACKGROUND

The present disclosure generally relates to apparatuses or modules for performing consumer research and methods for using same. More specifically, the present disclosure is directed to rotatable modules including different consumer research scenarios for performing fast and efficient consumer research.

Consumer studies are used to evaluate various types and forms of products in different situations and are an invaluable step in product development. Companies use consumer studies for various reasons, but the primary use for consumer studies is to determine what consumers think about potential products and how such products can be improved. Typical consumer studies may include, for example, product application, product consumption and sensory evaluation, and in-use conditions.

Consumer studies are generally categorized into three different types of studies including home use testing, central location testing and focus groups. With home use testing, consumers use specific products in the home over an extended period of time. After using the products, consumers provide written or verbal feedback regarding product attributes such as, for example, quality, quantity, and sensory evaluations (e.g., product aesthetics, smell, taste, texture, etc.). Central location tests are generally completed at a central location (e.g., a testing center) where consumers test products in private or public settings. As with home use testing, consumers then provide written or verbal feedback regarding specific product attributes. Finally, focus groups may include a one-time visit to a testing center, or may include any combination of home use or central location testing coupled with a focus group thereafter. Focus groups tend to group consumers according to similar criteria and require the use of a moderator to lead the group session. As with home use testing and central location testing, consumers in focus groups generally provide written or verbal feedback regarding product attributes at the end of the focus group session.

Certain types of consumer research are, however, lacking in time or space efficiency, thereby requiring more time to be spent collecting data for each consumer participant, which inherently increases costs for performing the consumer studies. For central location consumer studies that require different in-use conditions, for example, a consumer participant may be introduced to a first in-use scenario at a first location. The consumer participant may then be taken to a second location to evaluate a second in-use scenario. In situations where the first and second locations are not located very close to each other, or are not easily changed to different consumer scenarios, consumer studies take a longer amount of time and require a greater amount of space to complete the study. Accordingly, there exists a need for a more time-, space-, and cost-effective manner in which to perform consumer research studies.

SUMMARY

The present disclosure provides apparatuses for performing consumer research and methods for using same. In a general embodiment, apparatuses for performing consumer research are provided. The apparatuses include a rotatable platform including at least one divider separating the platform into at least two sections. Each of the at least two sections has a life-like scenario configured for use by a consumer participant during consumer testing.

In an embodiment, the divider is selected from the group consisting of a wall, a curtain, a panel, or combinations thereof. The wall may be stationary, moveable, foldable, collapsible, or combinations thereof. The divider may include a cut-out portion selected from the group consisting of a window, a door, or combinations thereof.

In an embodiment, the rotatable platform includes a trap door.

In an embodiment, the rotatable platform is substantially circular in shape and has a diameter from about 5 feet to about 40 feet, or from about 10 feet to about 35 feet, or from about 15 feet to about 30 feet, or from about 20 feet to about 25 feet. In an embodiment, the rotatable platform has a diameter that is about 20 feet.

In an embodiment, the rotatable platform rotates using a force selected from the group consisting of manual, mechanical, hydraulic, pneumatic, or combinations thereof.

In an embodiment, the at least two sections have the same size. Alternatively, the at least two sections have a different size.

In an embodiment, the rotatable platform is divided into at least three, four, five, six sections, or more.

In an embodiment, the life-like scenario includes stimuli selected from the group consisting of visual, audible, aroma, texture, or combinations thereof. The life-like scenario on each of the at least two sections may be different from the life-like scenario on the other of the at least two sections. Examples of the life-like scenario include a classroom, picnic area, family room, restaurant, car/van, exercise room, kitchen, dining room, playground, office, outdoors, nursery, daycare, etc. The life-like scenario may also include props selected from the group consisting of a desk, a blackboard, a picnic table, a picnic basket, a couch, a chair, a television, a restaurant booth, a car, a van, a motorcycle, a bike, a wagon, a stroller, a treadmill, a rock climbing wall, a stationary exercise bike, an elliptical machine, a pool, a kitchen table, a kitchen counter, a stove, a sink, a refrigerator, a formal dining room table, a slide, a merry-go-round, an office desk, a computer, a fax machine, a printer, grass, a tree, a plant, flowers, toys, a crib, a dresser, a rug, a rocking chair, or combinations thereof.

In another embodiment, apparatuses for performing consumer research are provided and include a rotatable platform with at least first and second sections separated by at least one divider. Each of the at least first and second sections including a life-like scenario configured for use by a consumer participant during consumer testing. The consumer research apparatus further includes a stationary platform at least partially surrounding the rotatable platform.

In an embodiment, the stationary platform completely surrounds the rotatable platform. Alternatively, the stationary platform only partially surrounds the rotatable platform (e.g., surrounds half, surrounds one quarter, etc.). The stationary platform may be at a vertical location with respect to the rotatable platform, the vertical location selected from the group consisting of above, below, equal to, or combinations thereof. The stationary platform may also be adjacent to the rotatable platform.

In yet another embodiment, systems for performing consumer research are provided. The systems include a rotatable platform with at least one divider separating the platform into at least two sections. Each of the at least two sections include a life-like scenario configured for use by a consumer participant during consumer testing. The system further includes at least one observation device. The observation device may be selected from the group consisting of a camera, a microphone, a one-way mirror, a window, a television, a computer, or combinations thereof.

In still yet another embodiment, methods for administering a consumer research test are provided. The methods include providing a rotatable platform with at least one divider separating the platform into at least two sections, and instructing the consumer participant to evaluate a product using the life-like scenario. Each of the at least two sections has a life-like scenario configured for use by a consumer participant during consumer testing.

In an embodiment, the life-like scenario includes props relating to the life-like scenario.

In an embodiment, the method further includes instructing the consumer to evaluate the product using the props relating to the life-like scenario.

In another embodiment, methods for administering a consumer research test are provided. The methods include providing a rotatable platform with at least one divider separating the platform into at least two sections, and observing the consumer participant evaluate a product using the life-like scenario. Each of the at least two sections includes a life-like scenario configured for use by a consumer participant during consumer testing.

In an embodiment, the life-like scenario further includes props relating to the life-like scenario.

In an embodiment, the methods further include instructing the consumer to evaluate the product using the props relating to the life-like scenario.

In yet another embodiment, methods for performing a consumer research test are provided. The methods include accessing a rotatable platform with at least one divider separating the platform into at least two sections, and evaluating a product using the props related to the life-like scenario. Each of the at least two sections includes a life-like scenario configured for use by a consumer participant during consumer testing and including props related to the life-like scenario.

In still yet another embodiment, methods for administering a consumer research test are provided. The methods include providing a rotatable platform with at least one divider separating the platform into at least two sections; instructing the consumer participant to access a first section of the platform, to evaluate a product using the life-like scenario of the first section, and to exit the first section of the platform; rotating the rotatable platform; and instructing the consumer participant to access a second section of the platform, and to evaluate a product using the life-like scenario of the second section. Each of the at least two sections comprising a life-like scenario configured for use by a consumer participant during consumer testing.

In an embodiment, the methods further include instructing the consumer participant to step onto a stationary platform upon exiting the first section of the platform.

In an embodiment, the methods further include instructing the consumer participant to step onto a stationary platform to exit the second section of the platform.

In an embodiment, the rotatable platform is rotated by an angle from about 45° to about 270°, or from about 90° to about 180°.

In yet another embodiment, methods for performing a consumer research test are provided. The methods include accessing a first section of a rotatable platform comprising at least one divider separating the platform into at least first and second sections; evaluating a product using the life-like scenario of the first section; exiting the first section of the platform; accessing the second section of the platform; and evaluating a product using the life-like scenario of the second section. Each of the at least first and second sections includes a life-like scenario configured for use during consumer testing.

In an embodiment, the methods further include stepping onto a stationary platform upon exiting the first section of the platform.

In an embodiment, the methods further include stepping onto a stationary platform to exit the second section of the platform.

In an embodiment, the rotatable platform is rotated by an angle from about 45° to about 270°, or from about 90° to about 180°.

An advantage of the present disclosure is to provide improved consumer research apparatuses.

Another advantage of the present disclosure is to provide apparatuses for consumer research that quickly and easily change scenarios for presentation to a consumer participant.

Yet another advantage of the present disclosure is to provide rotatable apparatuses for consumer research that quickly creates a variety of life-like situations for evaluation by a consumer within a limited amount of space.

Still yet another advantage of the present disclosure is to provide consumer research apparatuses that allow for single location, easy observation of at least two different observation areas or scenarios.

Another advantage of the present disclosure is to provide consumer research apparatuses that provide for direct observation of consumer research scenarios.

Yet another advantage of the present disclosure is to provide consumer research apparatuses that provide at least two realistic spaces for consumer research scenarios.

Still yet another advantage of the present disclosure is to provide consumer research apparatuses that require limited equipment for consumer observation.

Another advantage of the present disclosure is to provide consumer research apparatuses that can easily be adapted for multiple business segments.

Additional features and advantages are described herein, and will be apparent from, the following Brief Description of the Figures and Detailed Description.

BRIEF DESCRIPTION OF THE FIGURES

FIG. 4 is a top view of a consumer research apparatus in accordance with an embodiment of the present disclosure.

DETAILED DESCRIPTION

Figure 1:
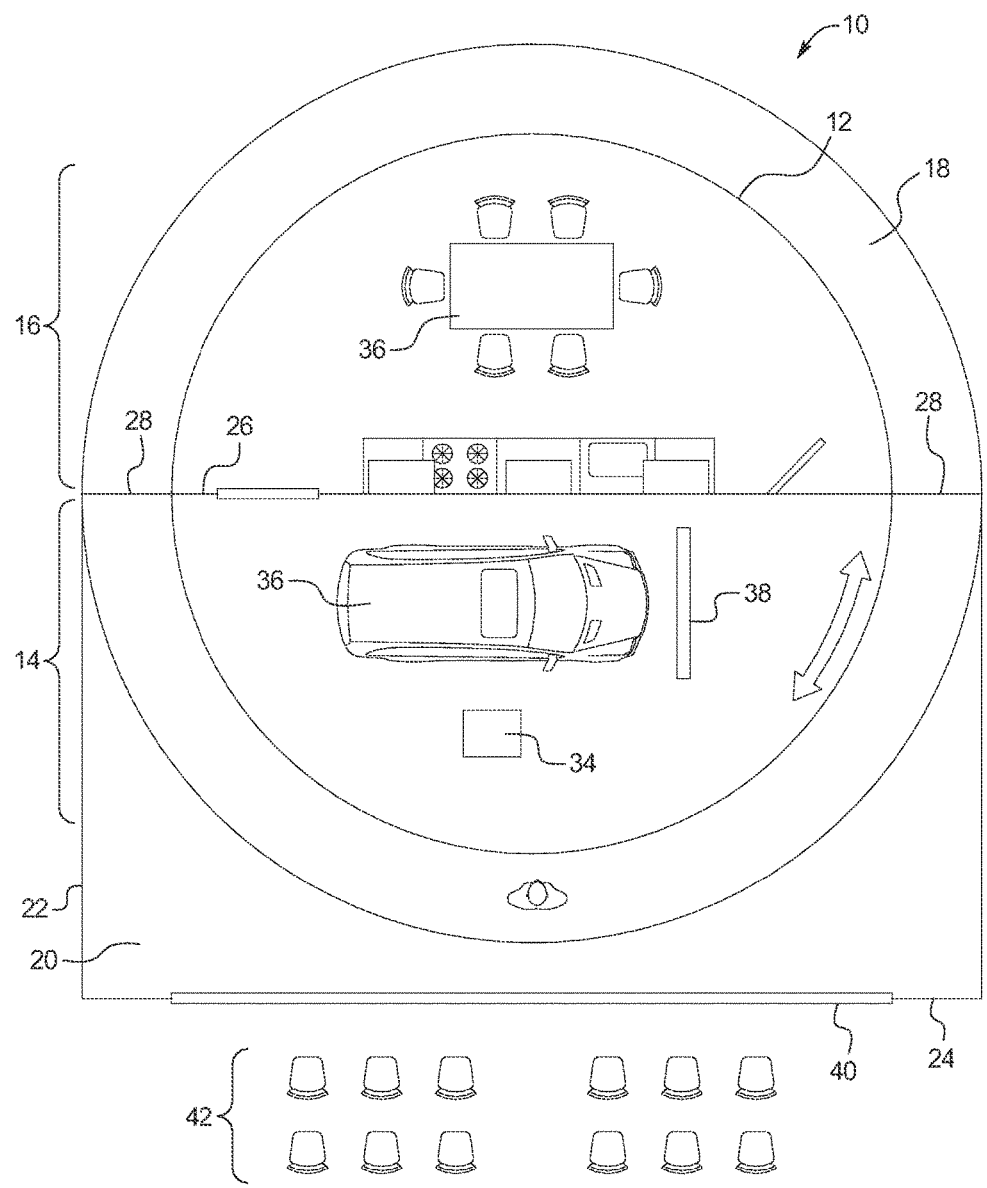
FIG. 1 is a top view of a consumer research apparatus in accordance with an embodiment of the present disclosure.

As used in this disclosure and the appended claims, the singular forms "a," "an" and "the" include plural referents unless the context clearly dictates otherwise. Thus, for example, reference to "a wall" includes two or more walls, and the like.

As used herein, "about" is understood to refer to numbers in a range of numerals. Moreover, all numerical ranges herein should be understood to include all integer, whole or fractions, within the range.

As used herein, a "life-like" or a "realistic" scenario refers to an event, scene, situation, scenario or the like that may be encountered by an individual during normal daily activities. Examples of a life-like or a realistic scenario include, but are not limited to, a classroom, picnic area, family room, restaurant, car/van, exercise room, kitchen, dining room, playground, office, outdoors, nursery, daycare, etc. The like-like scenario may include props including, but not limited to a desk, a blackboard, a picnic table, a picnic basket, a couch, a chair, a television, a restaurant booth, a car, a van, a motorcycle, a bike, a wagon, a stroller, a treadmill, a rock climbing wall, a stationary exercise bike, an elliptical machine, a pool, a kitchen table, a kitchen counter, a stove, a sink, a refrigerator, a formal dining room table, a slide, a merry-go-round, an office desk, a computer, a fax machine, a printer, grass, a tree, a plant, flowers, toys, a crib, a dresser, a rug, a rocking chair, etc.

As discussed above, certain types of consumer research are lacking in time or space efficiency, thereby requiring more time to be spent collecting data for each consumer participant, which inherently increases costs for performing the consumer studies. For example, for central location consumer studies that require different in-use conditions, a consumer participant may be introduced to a first in-use scenario at a first location. The consumer participant may then be taken to a second location to evaluate a second in-use scenario. In situations where the first and second locations are not located very close to each other, or are not easily changed to different consumer scenarios, consumer studies take a longer amount of time and require a greater amount of space to complete the study.

Indeed, most consumer research centers are limited by available space in which to create different consumer research scenarios. In order to meet all needs for space, situational research may be, for example, limited to one room with only two situations separated by a curtain. This observation area may also be completely separated from any observation booth, thereby requiring the use of audio and/or visual equipment to observe a first scenario. Further, since the two situations are separated by a curtain to maintain separate environments, observation may also require the use of another set of audio and visual equipment to observe the second scenario. The use of additional pieces of audio/visual equipment undesirably increases the costs of performing consumer research using at least two scenarios.

Applicant has surprisingly found a more time-, space-, and cost-effective manner in which to perform such consumer research studies. Accordingly, the present disclosure is related to consumer research apparatuses, or modules, that are rotatable and can be divided into at least two sections to provide at least two different consumer scenarios. The consumer research apparatuses may be located adjacent to a stationary platform upon which a consumer participant can stand. When the consumer participant has completed evaluation of a first scenario, the consumer participant may stand on the stationary platform as the rotatable platform rotates to present the consumer participant with a second scenario in just a matter of seconds. Providing this type of consumer research apparatus provides flexibility and efficiency of time, space and cost since consumer research may be performed in a timely fashion, in a number of different life-like scenarios, in a limited amount of space, and may be directly observed from one location or using one set of audio/visual equipment.

As shown in FIG. 1, a consumer research apparatus 10 is provided and includes a rotatable platform 12 that is divided into a first section 14 and a second section 16, and a stationary platform 18. Rotatable platform 12 may be any known shape including, for example, a circle, a square, a rectangle, or the like. In an embodiment, rotatable platform 12 has a substantially circular shape. Similarly, rotatable platform 12 may have any size known in the art so long as platform 12 is capable of presenting at least two different life-like scenarios for consumer research. For example, platform 12 may have a diameter ranging from about 5 feet to about 40 feet, or from about 10 feet to about 35 feet, or from about 15 feet to about 30 feet, or from about 20 feet to about 25 feet. In an embodiment, platform 12 has a diameter that is about 20 feet. Platform 12 is rotatable by any means known in the art including, for example, manual rotation, mechanical rotation, and similar types of forces. Additionally, consumer research apparatus 10 may include hydraulic machinery above or below platform 12 to allow for equipment or scenery to be raised or lowered to platform 12 quickly and efficiently.

As is shown in FIG. 1, rotatable platform 12 is divided into first and second sections 14, 16. The skilled artisan will appreciate, however, that rotatable platform 12 may be divided into any number of different sections that are the same or different sizes and/or shapes. For example, rotatable platform 12 may be divided into any number of sections including 3, 4, 5, 6, or 7 sections, or the like. Similarly, the sections of rotatable platform 12 may be of equal sizing (e.g., 3 equal thirds, four equal quarters, etc.), or may be of different sizing (e.g., 3 sections, wherein one section represents half of platform 12, and two sections represent equal quarters of platform 12, as shown, for example, by FIG. 4). Rotatable platform 12 may be divided into different sections using any dividers known in the art including, for example, walls (e.g., stationary, moveable, foldable, collapsible, etc.), curtains, panel-like room dividers, and the like. The skilled artisan will appreciate that any number or type of dividers may be used with the consumer research apparatuses 10 of the present disclosure.

Figure 2:
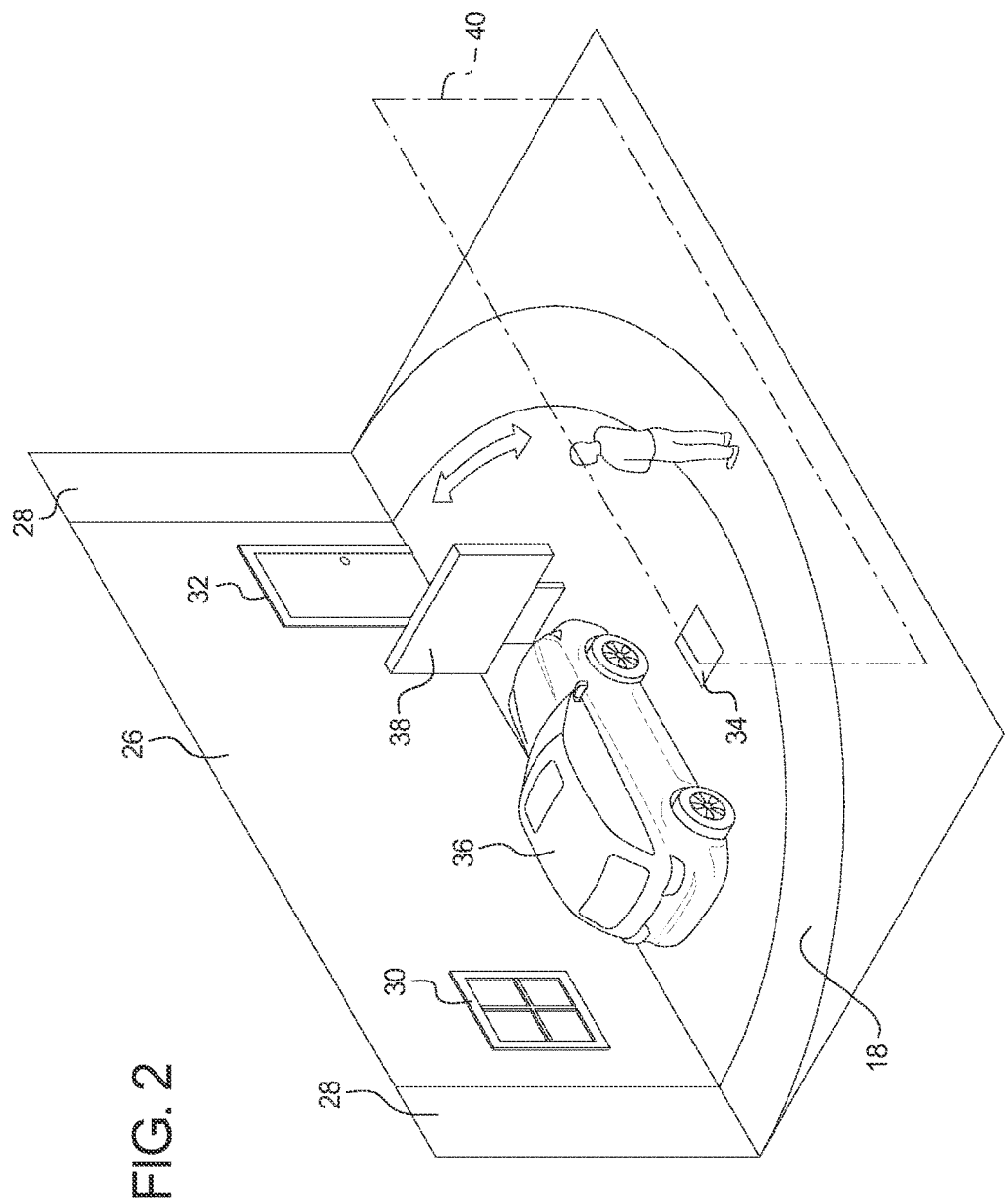
FIG. 2 is a perspective view of a first section of the consumer research apparatus of FIG. 1 in accordance with an embodiment of the present disclosure.

Consumer research apparatus 10 may be located in an open room, or may be partially or completely closed off to form an enclosed space for privacy during consumer testing. For example, FIGS. 1 and 2 illustrate consumer research apparatus 10 located, at least in part, in a room 20 that is closed on all sides. Room 20 is, therefore, bounded on two sides by side walls 22, back wall 24, rotatable platform 12 divider wall 26, and stationary platform 18 divider walls 28. Stationary platform 18 divider walls 28 may be integral with, or connected to, rotatable platform 12 divider wall 26 and may or may not rotate with rotatable platform 12. In this type of set-up, a consumer participant may be alone in enclosed space to perform the product testing in complete privacy. This idea of creating an enclosed space for complete privacy during consumer testing is applicable to, and may be used in conjunction with, any number of different sized and shaped sections of rotatable platform 12. Creation of an enclosed space may also be used for sensory deprivation purposes so that consumer testing is not tainted by external stimuli.

Rotatable platform 12 divider wall 26 may include any different number of, or any different type of, openings that may be used to create an open space instead of an enclosed space. For example, and as shown in FIGS. 1 and 2, rotatable platform 12 divider wall 26 may include a window 30 and/or a door 32. Window 30 may be used as a pass-through window between scenarios that allow for the passing of product samples and/or other stimuli to the consumer participant during testing. With respect to the addition of stimuli to a scenario, it will be appreciated that each different scenario may include different observation situations including different smells, sounds, sights, features, equipment, etc. Although illustrated as a window, the skilled artisan will understand that window 30 need not be a glass-paned window and may simply be a cut-out in any wall, curtain, or panel used to divide rotatable platform 12 into different sections.

Similarly, rotatable platform 12 divider wall 26 is illustrated as having door 32, which may also function as a pass-through opening to introduce product samples, other stimuli, and/or additional consumer participants or consumer testing administrators into the scenario. Again, although illustrated as a door, the skilled artisan will understand that door 32 need not be a typical door mounted on hinges and may simply be a covered flap, cut-out, etc. in any wall, curtain, or panel used to divide rotatable platform 12 into different sections. Rotatable platform 12 may also include other cut-out portions such as, for example, a trap door 34, which may be used for storage under platform 12, or as a pass-through area to add additional equipment, scenery, or other stimuli to the scenario.

As can be seen in FIGS. 1 and 2, rotatable platform 12 may include first section 14 that provides a first in-use scenario having any different number of, or any different type of, feature, or prop, 36 used to create a scene. In an embodiment, a first use scenario includes a feature that is a car to simulate the use of a product in a car. In this first use scenario, a consumer participant may step from stationary platform 18 onto rotatable platform 12 and sit in the car while testing the product. As shown in FIGS. 1 and 2, to enhance the sensory experience for the consumer participant, and to make the first use scenario seem more life-like, additional stimuli may be added to the scenario including, for example, a projector (not shown) that projects a driving scene onto a projection screen 38 so that the consumer feels like he or she is actually driving the car. Additionally, other props such as fans (not shown) may be used to enhance the scenario to make it feel more like a realistic driving experience with wind in the driver's face.

Figure 3:
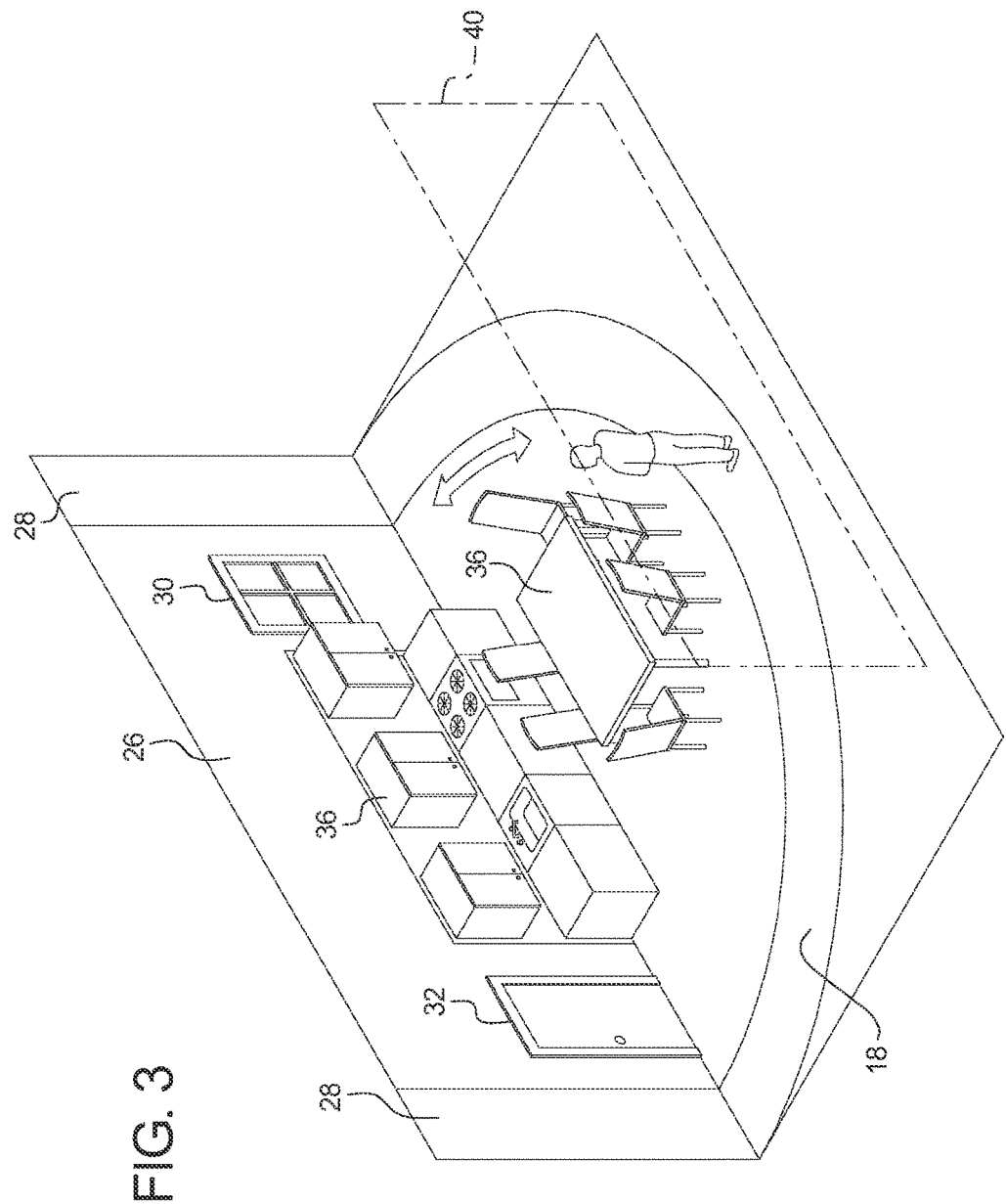
FIG. 3 is a perspective view of a second section of the consumer research apparatus of FIG. 1 in accordance with an embodiment of the present disclosure.

Once testing is completed in the first scenario (e.g., a car) of first section 14, the consumer participant may move from rotatable platform 12 to stationary platform 18 before rotatable platform 12 rotates to present a second scenario (e.g., a kitchen) of second section 16, as shown in FIG. 3. The skilled artisan will appreciate, however, that consumer research apparatus 10 need not include stationary platform 18 and may include only rotatable portion 12. In such an embodiment, a consumer participant may simply step off rotatable portion 12 onto the floor surrounding same. Once rotatable platform 12 has completely rotated to hide first section 14 and to present second section 16, the consumer participant may step onto rotatable platform 12 to test the product in a new scenario (e.g., a kitchen). In an embodiment, rotatable platform 12 includes features 36 such as, for example, a kitchen table, a sink, cupboards, a stove, etc. Similar to the first scenario of first section 14, the second scenario in second section 16 may include additional stimuli to simulate a more realistic environment. Examples of such stimuli that may be used with a kitchen scenario include, for example, food smells, sounds of a running dishwasher or clanging pans, or the like.

At any time before, during or after testing of a product, changes to a scenario may need to be made quickly and efficiently. For this reason, consumer research apparatus 10 may be configured to allow for access from the rear, or a hidden or non-visible section of rotatable platform 12 to allow for set-up or take-down of all or part of a scenario. For example, a consumer participant may perform an evaluation of a product in the first scenario of first section 14. During testing, the consumer research company administering the test may become aware of an element of the first scenario that they would like to change and have the consumer participant re-test. Therefore, while the consumer participant is testing the product in the second scenario of second section 16, the consumer research company may access first section 14 to change the element requiring changing so that upon completion of the product evaluation in second section 16, rotatable platform 12 may be rotated back to first section 14 quickly and easily for the consumer participant to re-evaluate the product in the modified environment.

As previously mentioned, it is possible to directly observe consumer research studies using consumer research apparatuses 10 of the present disclosure. In this regard, it may be possible to openly observe the testing area during testing. Alternatively, if the testing is performed in an enclosed space, the testing, or consumer research, may be directly observed using, for example, a one-way mirror 40 to a viewing area 42, as shown in FIG. 1. In yet another embodiment, consumer testing may be observed using audio and visual equipment. For example, in an embodiment, a camera (not shown) and a microphone (not shown) may be placed at any location near the testing area and transmit images and sounds from the testing to a remote location. The camera and microphone may also record the testing to be viewed at a later time. One advantage of using consumer research apparatuses 10 of the present disclosure is the need for only one set of audio/visual equipment. If, for example, enclosed room 20 were used for consumer research testing, one camera and one microphone may be located in room 20 at a located such that it can record consumer testing of first section 14, as well as second section 16 when rotatable platform 12 rotates to present the second scenario to the consumer participant. If rotatable platform 12 were not used, two sets of cameras and microphones would have to be used to record consumer testing of first section 14 and second section 16.

FIG. 4 illustrates another embodiment of a consumer research apparatus 10 of the present disclosure. As shown in FIG. 4, rotatable platform 12 may be divided into three different sections 44, 46, 48, each section having a different scenario. For example, section 44 may comprise half of the area of rotatable platform 12 and include a climbing rock wall as a feature 36. Section 46 may comprise one quarter of the area of rotatable platform 12 and include a treadmill as a feature 36. Finally, section 48 may comprise one quarter of the area of rotatable platform 12 and may include a stationary exercise bike as a feature 36. In this regard, consumer research apparatus 10 of FIG. 4 may be used to test an athletic performance consumer product using different exercise equipment as the different scenarios. The skilled artisan will appreciate, however, that the consumer research apparatuses of the present disclosure are not limited to those disclosed herein and that the consumer research apparatuses of the present disclosure may have any configuration and/or scenario features that may be useful for the present apparatuses.

Accordingly, the use of consumer research apparatuses 10 of the present disclosure provides many cost-effective benefits and advantages when performing consumer research testing. For example, consumer research apparatuses 10 allow for the use of one single observation room and one set of audio/video equipment to serve all observation areas. Use of consumer research apparatuses 10 of the present disclosure also provides many utilization benefits and advantages when performing consumer research testing. For example, consumer research apparatuses 10 allow for direct observation rather than just video or in-room observation, which could disturb/prejudice the data, provide increased storage space, provide a realistic space for the consumer scenario, and provide more efficiency and better control than in real life situations. In contrast, in-home use tests must rely on consumers to follow instructions consistently and there is no direct observation of their behaviors. Consumer research apparatuses 10 of the present disclosure allow for direct observation, video-taping (consistent angles, etc.) and coding of behaviors for data analysis.

Consumer research apparatuses 10 of the present disclosure also provide for flexibility of situations during consumer testing. For example, the apparatuses provide an opportunity for quick change of observation scenario, do not require realignment of cameras, limit the equipment needed for observation, provide for an indefinite number of observation scenarios, can be easily adapted for multiple business segments, and allow for observation of any consumption situation including, but not limited to, classroom, picnic area, family room, restaurant, car/van, exercise room, kitchen, dining room, playground, etc.

Methods for administering a consumer research test are also provided by the present disclosure. In an embodiment, a method includes providing a rotatable platform with at least one divider separating the platform into at least two sections, and instructing the consumer participant to evaluate a product using the life-like scenario. Each of the at least two sections has a life-like scenario configured for use by a consumer participant during consumer testing. The life-like scenario may include props relating to the life-like scenario, and the method may further include instructing the consumer to evaluate the product using the props relating to the life-like scenario.

In another embodiment, a method for administering a consumer research test is provided and includes providing a rotatable platform with at least one divider separating the platform into at least two sections, and observing the consumer participant evaluate a product using the life-like scenario. Each of the at least two sections includes a life-like scenario configured for use by a consumer participant during consumer testing. The life-like scenario may include props relating to the life-like scenario, and the method may further include instructing the consumer to evaluate the product using the props relating to the life-like scenario.

In yet another embodiment, a method for performing a consumer research test is provided and includes accessing a rotatable platform with at least one divider separating the platform into at least two sections, and evaluating a product using the props related to the life-like scenario. Each of the at least two sections includes a life-like scenario configured for use by a consumer participant during consumer testing and including props related to the life-like scenario.

In still yet another embodiment, a method for administering a consumer research test is provided. The method includes providing a rotatable platform with at least one divider separating the platform into at least two sections; instructing the consumer participant to access a first section of the platform, to evaluate a product using the life-like scenario of the first section, and to exit the first section of the platform; rotating the rotatable platform; and instructing the consumer participant to access a second section of the platform, and to evaluate a product using the life-like scenario of the second section. Each of the at least two sections comprising a life-like scenario configured for use by a consumer participant during consumer testing. The method may further include instructing the consumer participant to step onto a stationary platform upon exiting the first section of the platform, and/or instructing the consumer participant to step onto a stationary platform to exit the second section of the platform. The rotatable platform may be rotated by an angle from about 45° to about 270°, or from about 90° to about 180°.

In yet another embodiment, a method for performing a consumer research test is provided and includes accessing a first section of a rotatable platform comprising at least one divider separating the platform into at least first and second sections; evaluating a product using the life-like scenario of the first section; exiting the first section of the platform; accessing the second section of the platform; and evaluating a product using the life-like scenario of the second section. Each of the at least first and second sections includes a life-like scenario configured for use during consumer testing. The method may further include stepping onto a stationary platform upon exiting the first section of the platform, and/or stepping onto a stationary platform to exit the second section of the platform. The rotatable platform may be rotated by an angle from about 45° to about 270°, or from about 90° to about 180°.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus for performing consumer research, the apparatus comprising:
   a product for evaluation;
   a rotatable platform comprising at least one divider separating the rotatable platform into at least two sections, each of the at least two sections comprising a life-like scenario configured for use by a consumer participant to evaluate the product in each of the at least two sections during a consumer research test;
   at least one stationary platform surrounding the rotatable platform;
   at least one stationary platform divider wall on the stationary platform, which does not rotate with the rotatable platform; and
   at least one observation device for observing the consumer participant evaluate the product in each of the at least two sections.

2. The apparatus according to claim 1, wherein the divider is selected from the group consisting of a wall, a curtain, a panel, and combinations thereof.

3. The apparatus according to claim 1, wherein the divider is selected from the group consisting of stationary, moveable, foldable, collapsible, and combinations thereof.

4. The apparatus according to claim 1, wherein the divider comprises a cut-out portion selected from the group consisting of a window, a door, and combinations thereof.

5. The apparatus according to claim 1, wherein the rotatable platform comprises a trap door.

6. The apparatus according to claim 1, wherein the rotatable platform rotates using a force selected from the group consisting of manual, mechanical, hydraulic, pneumatic, and combinations thereof.

7. The apparatus according to claim 1, wherein the life-like scenario includes stimuli selected from the group consisting of visual, audible, aroma, texture, and combinations thereof.

8. The apparatus according to claim 1, wherein the life-like scenario is selected from the group consisting of a classroom, picnic area, family room, restaurant, car/van, exercise room, kitchen, dining room, playground, office, outdoors, nursery, daycare, and combinations thereof.

9. The apparatus according to claim 1, wherein the life-like scenario comprises props.

10. The apparatus according to claim 1, wherein the at least one observation device is selected from the group consisting of a one-way mirror, a computer, audio equipment, video equipment, and combinations thereof.

11. The apparatus according to claim 1, further comprising at least one wall, which, in conjunction with the divider and the stationary platform divider wall, encloses at least one section of the rotatable platform to form an enclosed space, such that the consumer participant within the enclosed space may be substantially isolated from external stimuli.

12. The apparatus according to claim 11, wherein the enclosed space is a partially enclosed space.

13. The apparatus according to claim 12, further comprising an open walkway into the partially enclosed space.

14. A method for administering a consumer research test, the method comprising:
providing a consumer research apparatus comprising a rotatable platform comprising at least one divider separating the rotatable platform into at least two sections, each of the at least two sections comprising a life-like scenario configured for use by a consumer participant during a consumer research test, at least one stationary platform surrounding the rotatable platform, and at least one stationary platform divider wall on the stationary platform, which does not rotate with the rotatable platform;
instructing the consumer participant to evaluate a product using the life-like scenario in the at least two sections of the rotatable platform; and
observing the consumer participant evaluate the product in the at least two sections of the rotatable platform through an observation device.

15. The method according to claim 14, wherein the life-like scenario further comprises props and further comprising instructing the consumer participant to evaluate the product using the props relating to the life-like scenario.

16. The method according to claim 14, wherein the life-like scenario includes stimuli selected from the group consisting of visual, audible, aroma, texture, and combinations thereof.

17. The method according to claim 14, wherein the divider is selected from the group consisting of a wall, a curtain, a panel, and combinations thereof.

18. The method according to claim 14, further comprising:
instructing the consumer participant to access a first section of the rotatable platform, to evaluate a product using the life-like scenario of the first section, and to exit the first section of the rotatable platform to the stationary platform;
rotating the rotatable platform; and
instructing the consumer participant to access a second section of the rotatable platform, and to evaluate a product using the life-like scenario of the second section.

19. The method according to claim 18, further comprising at least once:
rotating the rotatable platform; and
instructing the consumer participant to access a further section of the rotatable platform from the stationary platform, to evaluate a product using the life-like scenario of the further section, and to exit the further section of the rotatable platform to the stationary platform.

20. The method according to claim 14, further comprising instructing the consumer participant to step onto a stationary platform upon exiting each section of the rotatable platform.

21. The method according to claim 14, wherein the observation device is selected from the group consisting of a one-way mirror, a computer, audio equipment, video equipment, and combinations thereof.

22. The method according to claim 14, wherein at least one section of the rotatable platform is enclosed with at least one wall in conjunction with the divider and the stationary platform divider wall forming an enclosed space, such that the consumer participant may be substantially isolated from external stimuli within the enclosed space.

23. The method according to claim 22, wherein the enclosed space is a partially enclosed space.

24. The method according to claim 23, further comprising an open walkway into the partially enclosed space.

25. The method according to claim 22, further comprising an observation area outside of the enclosed space.

* * * * *